United States Patent Office 3,386,942
Patented June 4, 1968

3,386,942
STABILIZATION OF NON-YELLOWING SEGMENTED POLYURETHANE COPOLYMERS OF POLYMERIC DIOLS, FUNCTIONALLY ALIPHATIC DIISOCYANATES AND FUNCTIONALLY ALIPHATIC DIAMINES
Alan Bell, Charles J. Kibler, and James G. Smith, Kingsport, Tenn., assignors to Eastman Kodak Company, Rochester, N.Y., a corporation of New Jersey
No Drawing. Filed June 29, 1964, Ser. No. 378,963
19 Claims. (Cl. 260—37)

ABSTRACT OF THE DISCLOSURE

Non-yellowing stabilized elastomeric linear poly(ether or ester-urethane-ureas) suitable for spandex fibers and films containing as an additive (1) a 2,4,6-trialkylphenol wherein the total number of carbon atoms in the three alkyl radicals is from 20 to 60, or (2) said trialkylphenol in combination with one or more of (a) a mono or dihydric alcohol ester of thiodipropionic or thiodibutyric acid, including polyesters thereof which may be terminated with a monohydric alcohol, (b) an organic phosphite which may be monomeric or polymeric and may contain intralinear —O— or —S— atoms, (c) an aliphatic amine having a molecular weight above 280, (d) an inorganic pigment.

This invention is identified as Case H in a series of eight related patent applications being filed concurrently in the U.S. Patent Office.
The eight related cases are identified as follows:

| Case | Serial Number | Filed |
| --- | --- | --- |
| A | 379,002 | June 29, 1964 |
| B | 379,020 | June 29, 1964 |
| C | 378,950 | June 29, 1964 |
| D | 378,961 | June 29, 1964 |
| E | 379,019 | June 29, 1964 |
| F | 378,951 | June 29, 1964 |
| G | 378,711 | June 29, 1964 |
| H | 378,963 | June 29, 1964 |

This particular Case H is related to the applicants' earlier U.S. application Ser. No. 166,155 filed Jan. 15, 1962 (now U.S. Patent 3,238,178 patented Mar. 1, 1966) and covers new and improved spandex fibers of segmented polyurethane copolymers in which stabilizers are present, the copolymers being those described in Cases A, B, and C and also including those segmented copolymers derived from polyesters and poly(ester-ethers) as well as polyethers, where the urea segment comprises from about 2 to 25% by weight of the copolymer. Case H is limited to segmented copolymers prepared from functionally aliphatic diisocyanates and diamines (if not replaced by water). Case H provides stabilized characteristics which advantageously supplement the non-yellowing properties inherent in the segmented copolymers of Cases A, B, and C as fibers, films, and other shaped articles. These segmented copolymers are also included within the scope of Cases D, E, F, and G. These Cases A–G are summarized below.
The stabilized copolymers of the instant invention include a class (1) additive and usually at least one other additive of the following five classes of additives:

(1) From 0.1% to 10% by weight of the segmented copolymer of a 2,4,6-trialkylphenol stabilizer wherein the sum of the carbon atoms in all of the three alkyl radicals is from 20 to 60, (2) Optionally from 0.1 to 5% of a thioester which is a mono or dihydric alcohol ester of thiodipropionic acid or thiodibutyric acid in which the monohydric alcohol radicals are present in simple esters as alkyl radicals having from 12 to 20 carbon atoms and the dihydric alcohol radicals are present in polyesters as alkylene radicals having from 2 to 20 carbon atoms, said polyester having at least two repeating units and a molecular weight of from about 400 to about 4000, (3) Optionally from 0.1% to 2% of an organic phosphite having at least 2 organic radicals each of which has from 1 to 40 carbon atoms, especially organic radicals composed of carbon atoms, hydrogen atoms, and which optionally may include intra-linear —O— or —S— atoms between carbon atoms, said phosphites being monomeric or polymeric in molecular structure, (4) Optionally from about 1% to about 15% of an aliphatic amine having a molecular weight above about 280 which is defined by U.S. Patent 2,999,839.

(5) Optionally from 1% to 30% of titanium dioxide and/or one or more other inorganic pigments.

The sum of the percentages of the first four classes of additives is not to exceed about 15% based on the weight of the segmented copolymer.

An object of this invention is to provide synthetic essentially non-cross-linked elastomeric filaments, sometimes called spandex fibers, which possess unexpectedly improved elastomeric characteristics and are so greatly improved in their resistance to various forms of degradation, including that indicated by yellowing, that they can be considered as highly stable in various forms of use. A further object is to provide essentially linear segmented polyurethane copolymers of greatly improved stability which can be readily formed into such elastomeric filaments or other shaped elastomeric products. An additional object is to provide highly stabilized spinning solutions of such copolymers whereby highly stable filaments can be readily spun by wet or dry spinning procedures. Another object is to provide processes for accomplishing the above objects. Further objects will also be apparent from the disclosure in this specification.

The instant invention and the other seven related inventions pertain to elastomeric fibers and segmented polyurethane copolymers of which such fibers are composed. Prior art illustrative of related copolymers and elastomeric fibers includes Steuber U.S. Patent 2,929,804 which discloses poly(ether-urethane-ureas) and Schilt U.S. Patent 3,097,192 which discloses poly(ester-urethane-ureas) wherein the urea segments are present in an amount of from about 10% to about 40% by weight of the segmented copolymer and wherein all of the working examples teach that the urethane linkages are directly connected by an aromatic nuclear linkage, the advantageous character of this aromatic nuclear linkage being also emphasized elsewhere in the Steuber and Schilt specifications. Other related disclosures include U.S. 2,843,568; U.S. 2,929,800; U.S. 2,929,802; U.S. 2,929,803; U.S.

2,948,691; U.S. 2,957,852; U.S. 2,965,437; U.S. 3,044,987; U.S. 3,071,557 and U.S. 3,111,368.

Although the art is fairly well developed in the spandex fiber field, there are such a large number of unpredictable variables that it is very difficult to achieve further improvements as a result of experimentation since most experiments lead to inferior results. Discoveries in this field must therefore be considered as applicable to only those segmented copolymers as are clearly within the purview of the experimental results as established by working examples.

As a consequence of extensive research and investigation in this field, the above-mentioned series of eight related and unexpected discoveries have been made with respect to segmented polyurethane copolymers and elastomeric filaments thereof which are also referred to herein as spandex fibers. The other seven inventions which are inter-related are partially summarized as follows.

Case A filed by Davis, Kibler and Smith covers new and improved non-yellowing spandex fibers of novel segmented copolymers which are poly(ether-urethane-ureas) composed of (1) polyethers including urethane linked oligomers thereof having a molecular weight of from about 3,000 to about 12,000, (2) organic functionally aliphatic diisocyanates, and (3) water and/or organic functionally aliphatic non-hindered diamines, in which segmented copolymers from 2 to 9% by weight consists of urea segments. The surprising utility of these spandex fibers is in a large part due to the unexpected discovery that functionally aliphatic diisocyanates can be successfully reacted with polyethers having relatively high molecular weights and then be chain-extended, preferably using the process of Case E and advantageously also the process of Cases F and/or G. The successful use of water as a chain-extender in Case A achieves surprisingly advantageous results. The spandex fibers of Case A have greatly improved non-yellowing properties, superior elastomeric characteristics and other improved properties as compared to the prior art. However, even better properties are covered by Case C. The polyether portion can be replaced with a polyester or poly(ester-ether) of analogous properties.

Case B filed by Davis, Kibler and Smith covers new and improved non-yellowing spandex fibers of novel segmented copolymers which are poly(ether-urethane-ureas) composed of (1) polyethers including urethane linked oligomers thereof having a molecular weight of from about 600 to about 10,000, (2) organic functionally aliphatic diisocyanates, and (3) organic functionally aliphatic hindered diamines of which up to 50 mole percent can be replaced with water, in which segmented copolymers from about 5 to about 25% by weight consists of urea segments. The surprising utility of these spandex fibers is in a large part due to the unexpected discovery that functionally aliphatic diisocyanates can be successfully reacted with polyethers of an unexpectedly wide range of molecular weights when the chain-extender diamine has a functionally hindered aliphatic structure. The spandex fibers of this invention have greatly improved non-yellowing properties as compared to the prior art. They also have excellent elastomeric characteristics. The polyether portion can be replaced with a polyester or poly(ester-ether) of analogous properties. In order to provide satisfactorily spinnable dopes according to Case B when the urea segment is appreciably more than about 9% by weight of the segmented copolymer, it is generally necessary to use a process as described in Case E and advantageously also the processes of Case F and/or Case G. The modulus values of fibers at elongations of greater than 100% are at their most advantageous values when the hard segment is appreciably more than 9% by weight of the segmented copolymer.

Case C filed by Davis, Kibler and Smith covers new and improved non-yellowing spandex fibers of novel segmented copolymers which are poly(ether-urethane-ureas) composed of (1) copolyethers containing alkylene-cycloalkylene-alkylene hydrocarbon groups, said copolyethers having the formula:

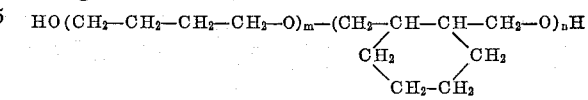

where $m$ is 3 to 25 times $n$, including urethane linked oligomers thereof having a molecular weight of from about 3,500 to about 12,000, and mixtures of such copolyethers with a minor proportion of poly(tetramethylene glycol), (2) organic functionally aliphatic diisocyanates selected from the meta and para position isomers of xylylene diisocyanate and (3) water and/or organic functionally aliphatic non-hindered diamines, in which segmented copolymers from 2 to 8% by weight consists of urea segments. The surprisingly unexpected magnitude of certain advantageous properties of these spandex fibers is in a large part due to the unexpected discovery that functionally aliphatic m- or p-xylylene diisocyanate can be especially advantageously reacted with certain polyether copolymers having relatively high molecular weights as described in Case D, and then be chain-extended using one or more of those advantageous processes covered by Cases E, F, and G. The spandex fibers of this invention have greatly improved non-yellowing properties, superior elastomeric characteristics and other improved properties as compared to the prior art. As compared to the generic disclosure in Case A, the spandex fibers of Case C are unexpectedly superior with respect to their properties at low temperatures as a result of the employment of the particular copolyethers. Moreover, the employment of m- and/or p-xylendiisocyanate provides elastomeric characteristics which are unexpectedly superior to those achieved by the use of other functionally aliphatic diisocyanates as covered by Cases A and B which are substantially more superior to those achieved when functionally aromatic diisocyanates are used as included in Cases D, F, and G. Exceptionally useful spandex fibers can be produced from copolymers having only 2% to 6% by weight of urea segments.

Case D filed by Bell, Kibler and Smith is related to their earlier U.S. application Ser. No. 231,586 (now U.S. Patent No. 3,243,413 patented on Mar. 29, 1966) and is based upon the discovery that unexpectedly advantageous low-temperature properties can be achieved with respect to novel segmented polyurethane copolymers including those illustrated by U.S. 2,929,804. Thus, Case D encompasses poly(ether-urethane-ureas) which are covered by Cases A–C and E–H, inclusive, which are composed of (1) copolyethers of the formula set forth in Case C but also including those where the molecular weight is as low as 600 and $m$ is 2 to 50 times $n$, (2) organic diisocyanates which are functionally aromatic as in U.S. 2,929,804 as well as those which are functionally non-aromatic as set forth in Cases A, B, and C, and (3) water and/or functionally aromatic and/or aliphatic organic diamines which can be non-hindered as in Cases A and C or hindered as in Case B, in which segmented copolymers from 2 to 40% by weight consists of urea segments.

Case E filed by Davis and Lyon covers a new and improved process for preparing those segmented polyurethane copolymers where the urea segment comprises from about 2–9% by weight of the copolymer as in Case A, 5–25% as in Case B and 2–8% as in Case C. Unexpectedly, it was discovered that rapid smooth reactions between the macro-diisocyanates and the chain-extender diamines (the employment of water is excluded) could be achieved by a relatively quite hot solution polymerization process in the range of 60–200° C. (preferably 75–150° C.) despite prior art teachings showing a preference that room temperatures or ice baths should be employed to avoid difficulties such as the formation of intractable gels. Moreover, the employment of high temperature polymerization was found to make possible the formation of more concentrated dopes of greater utility in spinning fibers. Even more advantageous results are achieved in combination with the process of Case F and/or Case G. The polyether portion of the segmented copolymer can be replaced with a polyester or poly(ester-ether) of analogous properties. Moreover, additives as covered by the instant Case H can be advantageously introduced into the solution of segmented copolymer produced according to Case E.

Case F filed by Knowles and Smith covers a new and improved process for preparing stable spinning solutions of those segmented polyurethane copolymers covered by U.S. 2,929,804, U.S. 3,097,192 and Cases A, B, C, and D, thereby including those segmented copolymers derived from polyesters and poly(ester-ethers) as well as polyethers, where the urea segment comprises from about 2 to about 40% by weight of the copolymer. The process comprises making a solution of the segmented copolymer according to a solution polymerization process which is followed by incorporating therein from 0.01 to 5% by weight of the copolymer of a stabilizer selected from acid halides and anhydrides of mono- and dicarboxylic acids. These stabilized solutions can be stored for extended periods of time without gelatin or precipitation. These solutions can be used as such or modified with other solvents and spun so as to yield fibers of improved uniformity and optimum properties. Moreover, additives as covered by the instant Case H can be advantageously introduced into the solution of segmented copolymer produced according to Case F.

Case G filed by Davis and Schulken covers a new and improved process for preparing new and improved copolymers and fibers thereof from novel spinning solutions of improved stability. Case G covers those segmented polyurethane copolymers covered by U.S. 2,929,804, U.S. 3,097,192 and Cases A, B, C and D thereby including those segmented copolymers derived from polyesters and poly(ester-ethers) as well as polyethers, where the urea segment comprises from about 2 to 40% by weight of the copolymer. The process comprises first preparing a macro-diisocyanate from one or more aliphatic or aromatic diisocyanates and a polyether, polyester, or poly(ester-ether) in a mole ratio substantially greater than 1.3 to 1 so as to form a macro-diisocyanate, treating the macro-diisocyanate so as to remove from about 40 to about 100% of the unreacted diisocyanate and then chain-extending the treated macro-diisocyanate with water and/or one or more aliphatic or aromatic organic diamines by a solution polymerization process to form a stable solution containing 5 to 50% by weight of segmented copolymer. This process unexpectedly yields stable solutions which can be stored for greatly extended periods of time before being spun into spandex fibers. These solutions can be used as such or modified with other solvents prior to spinning. Moreover, additives as covered by Case H can be advantageously introduced into the solution of segmented copolymer produced according to Case G.

Spandex fibers covered by Cases A, B, and C, which are also among those included in Cases D–G and the instant Case H, are generally characterized in that:

(1) They have a tenacity of at least 0.25 g./den., (2) They do not break when heated for about 5 sec. under a tension of 0.02 g./den. at about 150° C., (3) They have an inherent viscosity of at least 3.0 when dissolved in 60% phenol and 40% tetrachloroethane. The inherent viscosities are measured using solutions at about 25° C. where the concentration is from about 0.1 to 0.5 gram per 100 ml. of solution. Usually the concentration is 0.5 g./100 ml. except that a lesser concentration is employed when the solubility in 60% phenol and 40% tetrachloroethane is not sufficient. The slope of the curve representing inherent viscosities at various concentrations is rather flat; thus, the corresponding intrinsic viscosity is only slightly different from the values given for inherent viscosity. The procedural details for measuring inherent viscosities are given by K. Izard in Journal of Applied Physics, vol. 20, p. 564 (1949). Further details are given by Schulken and Sparks in Journal of Polymer Science, vol. 26, p. 227 (1957), (4) They have a permanent set of less than 25% based on their original length, in 1 minute and less than 15% in 60 minutes after releasing the tension following (a) elongation to 4 times their original length at the rate of at least 4,000% per minute, (b) thereafter allowing immediate contraction to 2.5 times their original length, (c) holding at this length for 16 hours at room temperature, and (d) then releasing the tension, (5) When released after elongation to 3 times their original length at the rate of about 1,000% per minute, the stress at 2 times their original length during their return cycle is greater than 0.010 g./den., (6) When released after elongation to 5 times their original length at the rate of at least 4,000% per minute, they are capable of recovering at least 95% of their elongation within one minute, (7) When released after elongation to 1.5 times their original length at the rate of about 100% per minute, they are capable of recovering at least 97% of their elongation within one minute, (8) They retain substantially their original color after 3 cycles of gas exposure according to AATCC standard test method 23–1962, cf. AATCC Technical Manual, Part II–B–73, Vol. XXXIX, 1963, "Colorfastness to Oxides of Nitrogen in the Atmosphere."

The segmented polyurethane copolymers of this invention can be prepared by various processes as described in the references cited above. However, it is considered especially advantageous to employ the following dual-operation process which is considered especially novel with respect to (a) those features covered by Cases E, F and G, (b) the combination of reactants, their proportions, the molecular weight of the macro-diisocyanate and the aliphatic nature of the isocyanate linkages as covered by Cases A, B and C, and (c) the nature of the polyether employed as covered by Cases C and D. The two basic operations of the overall process are as follows:

FIRST PROCESS OPERATION

A macro-diisocyanate is prepared by heating for from 2 to 10 hours at about 0°–175° C., optionally in the presence of a catalyst, under an inert atmosphere, a mixture of a diisocyanate and a polyether, in a mole ratio of from about 1.3 to 1 to about 10 to 1. The moles of remaining diisocyanate and macro-diisocyanate produced are calculated from the proportions of the reactants and the kinetics of the reaction as covered by Case G in particular.

Poly(ester-urethane-ureas) and poly(ester-ether-urethane-ureas) can be similarly prepared by replacing the polyether with an analogous hydroxyl-terminated polyester or poly(ester-ether) which can also be designated HO—P—OH as described in U.S. 3,097,192 such as polyethylene adipate, polyneopentyl sebacate, etc. including polyesters of hydroxycarboxylic acids where the carboxy end groups are terminated with a glycol, e.g. the polyester of 6-hydroxyhexanoic acid terminated with diethylene glycol, neopentyl glycol, 1,4-cyclohexanedimethanol, 1,4-butylene glycol, etc. Useful polyesters are described in U.S. Patent No. 3,097,192 in column 4 from line 40 to line 4 of column 5 and in U.S. Patent Nos. 2,933,477 and 2,933,478.

With respect to this first operation, the moles of unreacted diisocyanate remaining in the macro-diisocyanate reaction mixture can be removed partially or entirely by solvent extraction, distillation or by other process steps as covered by Case G. This is especially advantageous when the ratio of diisocyanate to polyether is greater than about 2 to 1, i.e., 1.8 or greater.

SECOND PROCESS OPERATION

A segmented polyurethane copolymer is prepared by dissolving the macro-diisocyanate, which may include unreacted diisocyanate, in a solvent, which is also a solvent for the segmented polyurethane copolymer being produced, and either (a) water is added at an elevated temperature or (b) a diamine solution in a solvent which may also be a solvent for the segmented polyurethane copolymer is added, or (c) a combination of (a) and (b) is employed. In some cases it is advantageous to gradually add the diamine over a period of from 5 minutes to 5 hours; however, it can be added within a few seconds, especially when a continuous process is employed. With regard to either the addition according to (a), (b) or (c) as just described, the overall ratio of amine radicals to isocyanate radicals is from about 0.7 to about one. The overall ratio may be seemingly less than 0.7 in some cases where water is introduced during the spinning of fibers from a solution of such a segmented copolymer, or while curing in contact with air having a significant relative humidity. When a non-hindered aliphatic diamine is being added it is advantageous to employ a temperature of 55°–60° C. or higher, i.e., about 60°–200° C., during the addition of the latter half of the non-hindered aliphatic diamine according to the process as covered by Case E. When water is added according to (a) or (c) as described above, the amount of water theoretically required can be calculated based upon the amount of isocyanate radicals which theoretically need to be converted to amine radicals so as to be available for reaction with the unconverted isocyanate radicals. The actual amount of water is advantageously two to twenty or more times the theoretical amount (can be up to 100 times) since the conversion step is relatively quite slow and the presence of excess water presents no particular difficulty in many solution spinning processes.

With respect to the second operation the solution of segmented copolymer which is produced can be stabilized against gelation or precipitation by adding up to 5% by weight of the segmented copolymer of an anhydride or an acid halide of an organic acid as covered by Case F.

Stabilizers as covered by Case H can be added to the solution of segmented copolymer prior to spinning spandex fibers. Other solvents can be added to the solution in order to form a spinning dope of optimum properties. Various spinning procedures are described in the references cited above for preparing spandex fibers, e.g. U.S. 3,111,368: moreover, such fibers can be used for various purposes as illustrated by U.S. 3,017,740, U.S. 3,038,295, U.S. 3,092,953 and U.S. 3,111,805, among others.

Most advantageously this invention pertains to stabilized segmented polyurethane copolymers having improved resistance to degradation and capable of forming non-yellowing elastomeric fibers having an elastic recovery from 50% elongation which is above 90%, a stress decay well below 20%, and other advantageous properties as described herein, said copolymer having an essentially linear structure and being a segmented urea/urethane/HOPOH copolymer wherein P represents the polymeric residue of a low melting hydroxyl-terminated polymer selected from the group consisting of polyethers, polyesters, poly(ester-ethers) and urethane-linked oligomers thereof, said segmented copolymer having a polymer melt temperature above 150° C. and an inherent viscosity of at least 3.0 when dissolved in 60% phenol and 40% tetrachloroethane, said copolymer consisting essentially of a multiplicity of urea segments containing at least one repeating unit of a fiber-forming polyurea, said repeating unit being of the formula:

—A—NH—CO—NH—D—NH—CO—NH— wherein —A— is the bivalent organic radical of a functionally aliphatic diisocyanate having the formula:

OCN—A—NCO and wherein —D— is the bivalent organic radical of a functionally aliphatic diamine having the formula:

NH$_2$—D—NH$_2$ which is functionally hindered or non-hindered, said polyurea as an independent fiber-forming polymer having a melting point of at least 200° C. in the fiber-forming molecular weight range above about 10,000, essentially all of said urea segments being connected to said polymeric residues by urethane linkages of the formula:

—NH—CO—O— wherein the —NH— of said urethane linkage is attached to the terminal radical —A— of said urea segment and the —CO— of said urethane linkage is attached to the terminal atom —O— of said polymeric residues, said polymeric residues being the radicals remaining after removal of the terminal hydroxyl groups of a polymer consisting essentially of a member selected from the group consisting of (1) a hydroxyl-terminated linear series of divalent hydrocarbon groups joined by at least one member selected from the group consisting of intra-linear oxy and carboxy linkages, and (2) oligomers of said series joined by from one to ten —CO—NH—A—NH—CO— intra-linear linkages wherein A is defined above, said polymer having a melting point below about 60° C. and a molecular weight in the range of from about 600 to about 12,000, said urea segments constituting (a) from about 2% to about 9% by weight of said copolymer when said diamine is non-hindered, and (b) from about 5% to about 25% when said diamine is hindered, said copolymer containing a maximum of about 15% by weight of the sum of the additives of the following classes (1), (2), (3) and (4) and a maximum of 45% of all five classes of the following additives:

(1) From 0.1% to 10% by weight of the segmented copolymer of a 2,4,6-trialkylphenol stabilizer wherein the sum of the carbon atoms in all of the three alkyl radicals is from 20 to 60.

(2) Optionally from 0.1 to 5% of a thioester which is a mono or dihydric alcohol ester of thiodipropionic acid or thiodibutyric acid in which the monohydric alcohol radicals are present in simple esters as alkyl radicals having from 12 to 20 carbon atoms and the dihydric alcohol radicals are present in polyesters as alkylene radicals having from 2 to 20 carbon atoms, said polyester having at least three repeating units and a molecular weight of from about 400 to about 4000, (3) Optionally from 0.1% to 2% of an organic phosphite having at least 2 organic radicals each of which has from 1 to 40 carbon atoms, especially organic radicals composed of carbon atoms, hydrogen atoms, and which optionally may include intra-linear —O— or —S— atoms between carbon atoms, said phosphites being monomeric or polymeric in molecular structure, (4) Optionally from about 1% to about 15% of an aliphatic amine having a molecular weight above about 280 which is defined by U.S. Patent 2,999,839, (5) Optionally from 1% to 30% of titanium dioxide and/or one or more other inorganic pigments.

These segmented polyurethane copolymers where the urea segment is composed of a single repeat unit can be represented by the general formula:

—A—NH—CO—O—P—O—CO—NH—
   A—NH—CO—NH—D—NH—CO—NH— wherein the urea segment has the formula:

—A—NH—CO—NH—D—NH—CO—NH— and the soft segment which contains the polyester glycol or other hydroxyl-terminated polymeric residue represented by the formula:

$$-A-NH-CO-O-P-O-CO-NH-$$

The A and D radicals can be different or the same in each repeat unit of the above formulas.

The soft segment $(GI)_x$ can be referred to as composed of glycol or other hydroxyl-terminated polymer (HO—P—OH) moieties G and diisocyanate moieties I. P can include monomer, dimer, trimer and other oligomer residues as more fully explained elsewhere herein. The urea hard segment $(DI)_y$ can be considered as being composed of diamine moieties D and diisocyanate moieties I. The values of $x$ and $y$ are on the average small integers which are at least 1. The preparation of the macro-diisocyanate from one mole of G and two moles of I can be schematically represented by the following assumed reaction:

(1) $\qquad 2I+G \rightarrow IGI$

However, the resulting macro-diisocyanate as actually obtained was found by statistical calculations and confirmed by nuclear magnetic resonance (NMR) evaluation to be a mixture of monomer, oligomers, and unreacted diisocyanate as follows:

(2) $q(2I+G) \rightarrow a_0 I + a_1 IGI + a_2 IGIGI$
$\qquad\qquad + \ldots a_x I(GI)_x + \ldots$ where $q$ represents a large number of molecules as ordinarily present in a reaction subject to statistical evaluation and $a_x$ is equal to the number of molecules of $I(GI)_x$. When $x$ becomes increasingly large the amount, $a_x$, of the oligomer having such a value for $x$ becomes vanishingly small. Thus, the glycol or other polymeric moiety P is comprised of monomer IGI and a series of oligomers in diminishingly small proportions.

The average composition of the reaction product of 2 moles of I and one mole of G has been found by NMR to be approximately as follows ($x$ is 2):

(3) $\qquad 4I+2G \rightarrow I+IGIGI$

When this average representation of the reaction mixture is solution polymerized with diamine D, the segmented polyurethane copolymer obtained has an average composition approximately as follows ($y$ is 2):

(4) $\qquad 2D+I+IGIGI \rightarrow (DI)_2 GIGI$

Therefore the urea hard segment is on the average composed of two repeat units —$(DI)_2$— rather than —DI— as would theoretically be obtained if the assumed situation actually took place as depicted by Equation 1.

The above factual analysis explains the discovery of the advantages achieved by removing all of the unreacted diisocyanate I from the actual reaction mixture represented by Equation 2 having the average composition represented by Equation 3. When the resulting macro-diisocyanate is reacted with diamine the segmented copolymer obtained has approximately the following average composition where $x$ is 2 and $y$ is 1:

(5) $\qquad D+IGIGI \rightarrow DIGIGI$

This result can be achieved by the process as covered by Case G whereby the urea hard segments on the average contain only about one repeat unit and the soft segments contain on the average approximately two repeat units, i.e., the macro-diisocyanate is composed of various oligomers which approximate a dimer on the average. Such a segmented copolymer is more soluble, solutions thereof are more stable and optimum fiber-spinning conditions can be much more advantageously obtained as covered by Case G. With respect to Case C this facilitates the unexpectedly advantageous preparation of segmented copolymers having only 2 to 6% urea hard segments.

The preceding explanation is obviously subject to appropriate variation when different proportions of reactants are employed as will be readily comprehended by those having ordinary skill in this art.

Solvents which can be employed in conducting the solution polymerization process according to the second operation described above are those solvents which are relatively inert to the reactants. Suitable solvents for use in this process include N,N-dimethylformamide, N,N-dimethylacetamide, tetrahydrofuran, dimethylsulfoxide, and mixtures thereof as well as mixtures including other solvents. Dimethylformamide and dimethylacetamide are the preferred solvents for use in the practice of this invention, especially since solutions suitable for the spinning of fibers may be made directly in these solvents.

Among those solvents which can be employed in various situations individually or in various combinations are aliphatic halides such as methylene chloride, chloroform, 1,2-dichloropropane, 1,1,2-trichloroethylene, etc., aromatic halides such as chlorobenzene, bromobenzene, fluorobenzene, dichlorobenzenes, difluorobenzenes, etc., as well as analogs, homologs and isomers of the aliphatic and aromatic halides having from 1 to 12 carbon atoms; cycloaliphatic and aromatic hydrocarbons having from 6 to 12 carbon atoms such as cyclohexane, cumene, cymene, benzene, toluene, xylenes, mesitylene, etc., and isomers and homologs thereof; aliphatic, cycloaliphatic and aromatic ethers having from 4 to 12 carbon atoms such as dibutyl ether, diisopropyl ether, anisole, phenetole, 1,2-dimethoxyethane, 1,2-diethoxyethane, diethylene glycol dimethyl ether, meta- and para-dioxanes, tetrahydrofuran, methyltetrahydrofuran, 8-oxabicyclo[4.3.0]nonane, etc., and isomers, homologs and analogs thereof; aliphatic ketones such as diisopropyl ketone, diisobutyl ketone and isomers and homologs thereof having up to 12 carbon atoms and preferably at least 7 carbon atoms; hexamethylphosphoramide and related phosphoramide solvents; acyl nitriles such as acetonitrile, propionitrile, n-butyronitrile, isobutyronitrile, and isomers and homologs having from 2 to 12 carbon atoms; organic linear and cyclic esters having from 2 to 12 carbon atoms such as ethyl acetate, methyl acetate, isobutyl isobutyrate, ethyl propionate, butyrolactone, caprolactone, methyl benzoate, etc., and isomers and homologs theerof; N,N-dialkylacylamides having from 3 to 8 carbon atoms, such as dimethylacetamide, diethylacetamide, dimethylformamide, diethylformamide, dimethylpropionamide, tetramethylurea, including the cyclic analogs such as N-methyl-pyrrolidinone, and other isomers, homologs and related analogs; dimethyl sulfoxide, dimethyl sulfolane, and related isomers, homologs and analogs of such solvents containing an —SO— group. Some of the solvent constituents mentioned above can also be present in the extractive chemical compositions employed according to the process of Case G.

The elastic properties of these materials may be varied by suitable compounds. The amount and type of compounding agent to be incorporated is dependent on the use for which the elastomer is intended. The compounding agents ordinarily used in the rubber industry are useful for this invention. These include carbon black, clay, silica, pigments, and plasticizers. Inorganic and organic coloring agents may be incorporated to give a well-defined color.

The segmented copolymers described herein can also be employed in the form of elastic sheets, film, unwoven fabrics and various shaped articles in a manner analogous to that well known with respect to rubber products.

In Cases A, B and E–H, inclusive, the polyether glycols having the formula HO—P—OH may be homopolymers or copolymers. The essential features are that they be difunctional and have a melting point below 50° C. The polyethers are primarily poly(alkylene oxide) glycols but some of the oxygens may be replaced with sulfur atoms and/or some of the alkylene groups may be replaced with arylene or cycloaliphatic radicals. Even where the linkages and types of organic radicals are the same, the compositions may still be copolymers, such as a copolyether derived from more than one glycol. Copolymer formation is useful when a macromolecular homopolymer melts too high to be useful in the process. Copolymers usually melt lower and show less tendency to produce undesirable crystallization in this segment of the final copolymer. These macrointermediates have hydroxyl end groups capable of reacting with one of the monomeric constituents of the high melting component to form a urethane linkage, i.e., yielding a macro-diisocyanate.

The polyether glycols of Cases C and D are unexpectedly valuable in achieving surprisingly superior results. These glycols contain alkylene-cycloalkylene-alkylene radicals which have not been specifically mentioned in the preceding paragraph. However, such polyether glycols are considered within the scope of the formula HO—P—OH, which also includes oligomers.

Representative polyether glycols which may be used include poly(oxathiaalkylene glycols), such as poly(1,4-dioxa-7-thianonane), poly(1-oxa-4-thiahexane), and poly(1,6-dioxa-9-thiahendecane); poly(alkylene glycols), such as poly(ethylene glycol), poly(propylene glycol), poly(tetramethylene glycol), and poly(decamethylene glycol); polydioxolane and polyformals prepared by reacting formaldehyde with other glycols or mixtures of glycols, such as tetramethylene glycol and pentamethylene glycol. Some of the alkylene radicals in these compositions may be replaced with arylene or cycloaliphatic radicals.

The difunctional polyethers include poly(alkylene glycols), which may be represented by the formula shown in column 7 of U.S. Patent No. 2,929,804.

The melting points of the polyether glycols are below about 50° C. For example, poly(tetramethylene glycol) having an average molecular weight of 1,000 melts at about 20° C.; this homopolymer could also be employed as an oligomer having at least two internal

—CO—NH—A—NH—CO— linkages, i.e., a trimer melting at below 50° C. Poly(tetramethylene glycol) of about 3,000 molecular weight melts at about 40° C. It can also be employed as a dimer, trimer or tetramer. The melting points of the polyether glycols are generally not sharp and may vary for a given molecular weight. Thus, some samples of the higher molecular weight polyether glycols (including oligomers) may have apparent melting points as high as 55° C. Preferred hydroxyl-terminated polymers comprise polymers of tetramethylene glycol; these include homopolymers and especially copolymers of tetrahydrofuran and 8-oxabicyclo[4.3.0]nonane, cf. Case D.

The especially preferred diisocyanates which can be employed in all of Cases A–H, inclusive, are functionally aliphatic and most advantageously are those compounds solely composed of hydrogen atoms, up to about 17 carbon atoms and two isocyanate radicals, each of which isocyanate radicals is attached to a separate carbon atom which is attached to three other atoms by single covalent bonds of the type well known in hydrocarbon chemistry. Specific examples include 1,6-hexane diisocyanate and other alkane diisocyanates having from 4 to 17 carbon atoms and position isomers and homologs 1,4-cyclohexanebis(methyl isocyanate) and position isomers and homologs thereof as well as other alkylene-cycloalkylene-alkylene diisocyanates having from 7 to 17 carbon atoms, cyclohexane-1,4-diisocyanate and 2,2,4,4-tetramethyl-1,3-cyclobutane diisocyanate and position isomers and homologs of these two compounds as well as other cycloalkylene diisocyanates having from 5 to 17 carbon atoms, 1,8-menthanediisocyanate and position isomers and homologs thereof as well as other alkylene-cycloalkylene diisocyanates having from 6 to 17 carbon atoms, p-xylylene diisocyanate and position isomers and homologs thereof as well as other alkylene-arylene-alkylene diisocyanates having from 10 to 17 carbon atoms. The cycloalkylene radicals can advantageously include di-valent cyclobutane radicals including alkylene-cyclobutylene-alkylene radicals and position isomers as well as homologs thereof having from 8 to 17 carbon atoms.

According to Cases D, F and G the diisocyanates which can be employed appear to include any aromatic diisocyanate whereby the polyurea hard segment can be present in an amount up to 40 percent by weight. Aromatic diisocyanates are useful because they form polyureas of extremely high melting point. A "hard segment" containing a unit of such a polymer provides a "tie point" for joining the low-melting, amorphous "soft segments," so that a polymer is produced having good elastic properties, i.e., a high tensile recovery and a low stress decay. Suitable diisocyanates include p-phenylene diisocyanate, 4,4'-biphenylene diisocyanate, p,p'-methylenediphenyl diisocyanate, p,p'-isopropylidenediphenyl diisocyanate, 2,4,6-trimethyl-1,3-phenylene diisocyanate, etc. The diisocyanates may contain other substituents, although those which are free from reactive groups other than two isocyanate groups are ordinarily preferred. Diisocyanates may be used in accordance with the process of Case G even though they may otherwise tend to produce polyester-urethane-ureas which would be difficultly soluble in solvents which are useful for spinning of fibers and would tend to yield gelled polymers according to prior art processes.

Since the prior art indicates that only certain aromatic diisocyanates would be suitable for preparing advantageous elastomeric fibers it would appear that any structure not specifically indicated to be useful would be unsatisfactory in view of the critical nature of the overall molecular configuration of the desired segmented polyurethane copolymers. However, the concept embodied in Case G has to a great extent overcome the necessity for such limitations.

The prior art also takes into account the erroneous assumption that the formation of isocyanate-terminated polyethers (or polyesters) will be accompanied by no appreciable chain lengthening if two moles or more of diisocyanate are reacted per mole of polyether. If less than a 2:1 molar ratio were to be used, it was thought that a polyether-urethane would be formed with corresponding increase in molecular weight. The use of a 2:1 molar ratio of diisocyanate to polyether was preferred.

The errors in these assumptions are explained herein and in particular with regard to the process covered by Case G.

The diamines employed herein are advantageously diprimary diamines although a small proportion of a disecondary diamine may be included. Two or more diamines can be employed in admixture or in sequence so as to form copolymeric segments which may or may not occur in blocks of identical repeat units. Moreover, the diamine can be a linear polymer having an amino group on each end and containing internal linkages such as urea, amide, sulfonamide, urethane, ester, etc.

Preferred diamines which can be employed in all of Cases A–H, inclusive, are functionally aliphatic and most advantageously are those compounds solely composed of hydrogen atoms, up to about 17 carbon atoms, and two amino radicals (preferably —NH₂ radicals), each of which amino radicals is attached to a separate carbon atom which is attached to three other atoms by single covalent bonds of the type well known in hydrocarbon chemistry.

The particularly preferred diamines for Cases A and C are functionally non-hindered, whereas those which are required to be used for Case B are functionally hindered diamines in which there is a pronounced degree of steric hindrance at the amino groups. Cases D–H, inclusive, can employ either hindered or non-hindered diamines.

The hindered functionally aliphatic diamines of the first type are those where each of the amino radicals is attached to an alpha carbon atom which is attached to a beta carbon atom which is attached to three other carbon atoms. In other words there is a tertiary carbon atom in the β-position with respect to each amino radical. This tertiary carbon atom can be the same atom with respect to both of the amino radicals. Examples of these hindered diamines include 2,2,4,4 - tetra-alkyl - 1,3 - cyclobutanediamines where the alkyl radicals can be the same or different and contain from 1 to 4 carbon atoms, β,β,β',β'-tetra-alkyl-polymethylenediamines where the alkyl radicals contain from 1 to 4 carbon atoms (two of which are positioned in β-relationship to each of the amine radicals) and there are from 4 to 10 carbons in the polymethylene chain as for example 2,2,3,3-tetramethyl-1,4-butanediamine, and 2,2-dialkyl-1,3-propanediamines where the alkyl radicals contain from 1 to 4 carbon atoms such as 2,2-dimethyl-1,3-propanediamine.

The hindered functionally aliphatic diamines of the second type are those where each of the amino radicals is attached to a carbon atom which is attached to three other carbon atoms. In other words there is a tertiary carbon atom in the α-position with respect to each amino radical. Examples of these hindered diamines include 1,8-methanediamine and various homologs thereof as well as many other sterically hindered compounds.

The non-hindered functionally aliphatic diamines are those where neither of the carbon atoms in the α- or β-position to the amino radical is a tertiary carbon atom. Examples of these diamines include hexamethylenediamine and those other alkanediamines having from 2 to 17 carbon atoms, 1,4-cyclohexanebis(methylamine) and position isomers and homologs thereof as well as other alkylene-cycloalkylene-alkylene diamines having from 5 to 17 carbon atoms, cyclohexane-1,4-diamine and position isomers and homologs thereof as well as other cycloalkylene diamines having from 3 to 17 carbon atoms, p-xylylene diamine and position isomers and homologs thereof as well as other alkylene-arylene-alkylene diamines having from 8 to 17 carbon atoms. The cycloalkylene radicals can advantageously include divalent cyclobutane radicals including alkylene-cyclobutylene-alkylene radicals and position isomers as well as homologs thereof having from 6 to 17 carbon atoms.

The position isomers mentioned in this specification include cis and trans isomers and various mixtures thereof as well as other position isomers such as those in ortho, meta or para positions, etc.

According to Cases D, F and G the primary diamines which can be employed may be aliphatic, alicyclic, aromatic, or heterocyclic diamines. It is required that these diamines be combined with suitable coreactants to form a urea which melts above 200° C. Suitable diamines include ethylenediamine, tetramethylenediamine, pentamethylenediamine, hexamethylenediamine, heptamethylenediamine, octamethylenediamine, p-xylylenediamine, 1,4-diaminocyclohexane, p-phenylenediamine, 1-methyl-2,4-diaminobenzene, bis(p-aminocyclohexyl) methane, and many others. Derivatives of these diamines may also be used as long as the substituents do not interfere with the polymerization. For example, they may have hydrocarbon side chains or be substituted with halogens or nitro groups which are inert under the conditions used herein.

However, it is especially preferred to employ the functionally aliphatic diamines, especially as regards Cases A, B, C, E and H. These are limited to the non-hindered diamines in Cases A and C and to the hindered variety in Case B. Both varieties can be employed in Cases E and H. Of course, these functionally aliphatic diamines can also be employed in Cases D, F and G along with other types of diamines including functionally aromatic diamines such as tolylenediamine, heterocyclic diamines such as piperazine, substituted piperazines, and many others.

It is indicated in the prior art that for utility in fiber and filament applications, it is desirable to have elastic products which require no aftercuring or aftertreatment. In order to be suitable in textile applications for the replacement of rubber yarns, a synthetic elastic fiber should have the following properties as a minimum requirement: tensile recovery of 90% or more, stress decay of less than 20%, and fiber sticking temperature of over 150° C. It is readily apparent that the spandex fibers of the present invention are clearly quite superior with respect to the above minimum requirements. It would have been expected that the proportion of urea hard segments would have to constitute at least about 10% of the segmented copolymer since lower percentages would not be thought to have been capable of forming improved spandex fibers or of forming useful spinning solutions for making such fibers. Similar shortcoming would also have been expected with regard to using high molecular weight polyethers, whereas molecular weights up to 10,000 to 12,000 were unexpectedly found to give improved results. Moreover, the surprisingly great improvement as to low temperature properties achieved as particularly covered by Cases C and D was quite unexpected. Cases A–D and H cover new and improved copolymers and Cases E–G cover new and improved processes and spinning solutions which may also include prior art copolymers in Cases F and G.

Several specific examples of the present invention of Case H are given in related Cases A–G and will serve to illustrate this invention.

Trialkylated phenols as defined above are present in all embodiments of this invention and include a great number of homologous compounds, e.g., 2,6-di-n-dodecyl-p-cresol, 2,6 - bis(1 - methylheptadecyl) - p - cresol, 2,4,6 - tridecyl-phenol, 2,4,6 - trioctadecylphenol, 2,6 - didecyl - 4 - tert. butylphenol, etc.

The thioester polyester stabilizers are described in Tholstrup et al. U.S. patent application Ser. No. 309,339 filed on Sept. 16, 1963.

The phosphites which are useful are well known in the art.

Stabilized elastomers have been described in various patents cited hereinabove including U.S. 2,999,839, U.S. 2,999,841, U.S. 2,999,842 and U.S. 3,085,991. However, none of the references applicable to the present invention relate to the particular problem of further stabilizing novel elastomeric copolymers, as defined herein, which are already inherently non-yellowing in normal use. In fact, many of the stabilizers suggested in this art are of no value in the copolymers with which this invention is concerned. This is particularly true with regard to phenolic compounds.

Moreover, various combinations of the above listed five classes of additives produce synergistic effects as will also become apparent from the examples given below.

The following examples will serve to further illustrate the invention of Case H.

This invention can be further illustrated by the following examples of preferred embodiments although it will be understood that these examples are included merely for purposes of illustration and are not intended to limit the scope of the invention unless otherwise specifically indicated:

Examples 1A–1K.—Stabilization of segmented copolymers of copoly(THF+6% OBN), p-xylylene diisocyanate and 2,2,4,4-tetramethyl-1,3-cyclobutanediamine A segmented copolymer was prepared as described in Example 18 of Case B. To the final dope, a solution of the particular antioxidant system to be studied dissolved in N,N-dimethylacetamide was added. A dispersion of titanium dioxide in N,N-dimethylacetamide was also added. The mixture was rolled for at least four hours to make the mixture homogeneous, and then wet spun in the normal manner.

The fiber samples were then placed in an oven at 125° C. Periodically, samples were removed and the tenacity and elongation determined. The following table summarizes the results. (TWTT—too weak to test.)

Test data on the samples in the following table further illustrate the stabilization of segmented copolymers of

| Sample | Antioxidant System | Percent TiO₂ | No. of Hrs. | Percent of original value | |
|---|---|---|---|---|---|
| | | | | Tenacity | Elongation |
| A | None | 2 | 15 | TWTT | |
| B-1 | 1% 2,6-didodecyl-p-cresol, 0.5% dilauryl thiodipropionate | 2 | 111 | 15 | 95 |
| B-2 | do | 2 | 159 | TWTT | |
| C | 2% 2,6-didodecyl-p-cresol | 2 | 159 | 34 | 173 |
| D | 1% 2,6-didodecyl-p-cresol, 0.5% dilauryl thiodipropionate, 1% poly(pentaerythritol phosphite) | 2 | 159 | 6 | 56 |
| E | 1% 2,6-didodecyl-p-cresol, 0.5% poly TDP (M.W. 3000), 1% poly(pentaerythritol phosphite) | 2 | 159 | 24 | 121 |
| F | 2% 2,6-bis(methylheptadecyl)-p-cresol, 0.5% poly TDP (M.W. 1200), 1% poly(pentaerythritol phosphite) | 2 | 159 | 6 | 52 |

It may be seen that the use of the phenolic stabilizers increases the life of the fiber by a factor of approximately 7 (compare A and B). The addition of a phosphite ester provides an additional lengthening of the life of the fiber (compare B and D). Poly TDP (samples E and F) is a low molecular weight polyester prepared from thiodipropionic acid, 1,4-cyclohexanedimethanol and terminated with stearyl alcohol. As the two samples demonstrate, this material is equivalent or superior to dilauryl thiodipropionate in its synergistic action with the trialkyl-phenols.

The fibers were also tested in a Fade-Ometer, i.e., the fibers were exposed to the light of an arc lamp for varying periods of time. This test is actually a combination of a light stability with an oven stability test since the temperature of the testing chamber shows a black panel temperature of 150° F. (65° C.). Fibers were examined after 20, 40 and 60 hr. exposure. Samples were considered to have failed when they developed a stickiness on the surface and/or when the fibers broke under their own tension.

Results are shown in the following table.

| Sample | Antioxidant System | Percent TiO₂ | Sample failed in Hr. |
|---|---|---|---|
| G | None | 4 | 20 |
| H | 2% didodecyl-p-cresol | 4 | 60 |
| I | 2% dilauryl thiodipropionate | 4 | 20 |
| J | 1% didodecyl-p-cresol, 0.5% dilauryl thiodipropionate | 4 | >60 |
| K | 2% bis(methylheptadecyl)-p-cresol, 1% dilauryl thiodipropionate, 1% poly(pentaerythritol phosphite) | 4 | >60 |

A comparison of the above samples G, H and I shows that the substituted phenol, didodecyl-p-cresol, greatly improves the fiber stability while the thiodipropionic acid ester alone does not. The combination of the trialkyl phenol and the thiodipropionic acid ester (sample J) provides a more stable fiber than either of the stabilizers alone. This is a clear indication of synergistic action. Sample K illustrates the use of a second substituted phenol and the use of a phosphite compound along with the phenolic-thio-ester system.

Examples 2A–2HH.—Stabilization of segmented copolymers of copoly (THF+6% OBN), p-xylylene diisocyanate and 2,2,4,4-tetramethyl-1,3-cyclobutanediamine (Polymer A) and 1,6-hexanediamine (Polymer B)

copoly(THF+6% OBN), p-xylylene diisocyanate and 2,2,4,4-tetramethyl-1,3-cyclobutanediamine (Polymer A prepared as in Example 18 of Case B) and the segmented copolymer of copoly (THF+6% OBN), p-xylylene diisocyanate and 1,6-hexanediamine (Polymer B prepared as in Example 7 of Case C). All samples (A through HH) remained white after being subjected to three cycles in Standard Test Method No. 23–1962 as described on page B-73 of Part II of the A.A.T.C.C. Technical Manual, Vol. XXXIX, 1963.

Samples A and B of Example 2 present comparative data with respect to the results obtained by the use of the stabilizers according to this invention. Samples C through CC illustrate the particular effectiveness of various combinations of the five classes of additives. The use of a high molecular weight aliphatic amine (Class 4 additive) is particularly efficacious when a premetallized dye such as Isolan Yellow GSA (Verona Dyestuffs, Union, N.J.) is used to dye the fiber (compare Sample D with E and Sample U with V). The overall effectiveness of trialkylated phenols of instant invention in combination with an aliphatic amine, a thioester and/or a phosphite ester is illustrated by Samples X and G. These combinations have excellent oven stability and the Fade-Ometer life is unexpectedly advantageous for both dyed and undyed samples.

It is obvious from these data for Example 2 that in situations where sunlight exposure is not encountered, an unexpectedly advantageous system results when these trialkylated phenols are used in conjunction with a thiodipropionate ester (see Samples N and O) and/or a phosphite ester (see Samples E and L).

There are listed in U.S. Patent 2,999,841 about twenty-eight phenolic stabilizers for cured polyurethane elastomers. Many of these stabilizers such as 2,2'-methylene-bis(6-tert-butyl-4-methylphenol), 4,4'-bis(2-tert-butyl-5-methylphenol)sulfiite, 2-tert-butyl-4-(4-tert-butylphenyl)-phenol and similar compounds are unsatisfactory because they are subject to gas yellowing. However, there are a few phenolic compounds listed in U.S. Patent 2,999,841 which do not gas yellow. They are of dubious value for stabilization of the elastomers of this invention as shown by the data obtained on Samples DD, EE, FF, GG, and HH of Example 2.

EXAMPLES 2A–2HH

| Sample | Additives (Percent) | | | | | Init. Ten., g./d. | Percent Tenacity Retained | | | Fade-Ometer, Hours | | Polymer Type |
|---|---|---|---|---|---|---|---|---|---|---|---|---|
| | TiO₂ ᵃ | Phenolic | DMAM ᵇ | Phosphite | Thioester | | After— | | | | | |
| | | | | | | | 15 hrs. | 63 hrs. | 111 hrs. | Undyed | Dyed | |
| A | 4 | | | | | 0.42 | ¹10 | | | <10 | <10 | B |
| B | | | | | | 0.49 | ¹5 | | | <10 | <10 | B |
| C | 4 | 4 BMHPC ᵠ | 5.0 | ᵈ 2 | ᵃ 1.0 | 0.38 | 100 | 50 | 25 | 50 | 50 | A |
| D | 4 | 4 BMHPC ᵠ | 2.5 | ᵈ 2 | ᵃ 1.0 | 0.29 | 105 | 50 | 13 | 50 | 50 | A |
| E | 4 | 4 BMHPC ᵠ | | ᵈ 2 | ᵃ 1.0 | 0.42 | 103 | 95 | 38 | 40 | 10 | B |
| F | 4 | 4 BMHPC ᵠ | 2.5 | ᶠ 1 | | 0.46 | 91 | 10 | TWTT | 60 | 30 | B |
| G | 4 | 4 BMHPC ᵠ | 2.5 | ᵉ 1 | ᵉ 1.0 | 0.38 | 100 | 48 | 22 | 60 | <40 | A |
| H | 4 | 4 BMHPC ᵠ | 5.0 | | | 0.43 | 95 | 22 | TWTT | 60 | <40 | B |
| I | 4 | 4 BMHPC ᵠ | ᵍ 2.5 | | | 0.45 | 87 | 25 | TWTT | 60 | <30 | B |
| J | 8 | 4 BMHPC ᵠ | 2.5 | | | 0.43 | 92 | 18 | TWTT | 60 | <40 | B |
| K | 16 | 4 BMHPC ᵠ | 2.5 | | | 0.40 | 105 | 25 | TWTT | 60 | 40 | B |

EXAMPLES 2A–2HH—Continued

| Sample | Additives (Percent) | | | | | Percent Tenacity Retained | | | | Fade-Ometer, Hours | | Polymer Type |
|---|---|---|---|---|---|---|---|---|---|---|---|---|
| | TiO$_2$ s | Phenolic | DMAM t | Phosphite | Thioester | Init. Ten., g./d. | After— | | | Undyed | Dyed | |
| | | | | | | | 15 hrs. | 63 hrs. | 111 hrs. | | | |
| L | 4 | 2 BMHPC q | | c 1 | b 1.0 | 0.45 | 88 | 85 | 66 | 60 | <20 | A |
| M | 12 | 1 DDPC r | | | a 0.5 | 0.39 | | 92 | 72 | 60 | <20 | A |
| N | 8 | 1 DDPC r | | | a 0.5 | 0.44 | | 91 | 80 | 60 | <10 | A |
| O | 4 | 1 DDPC r | | | a 0.5 | 0.48 | | 93 | 39 | 60 | <10 | A |
| P | | 1 DDPC r | | | a 0.5 | 0.45 | | 102 | 50 | 20 | <10 | A |
| Q | 4 | 2 DDPC r | | | | 0.48 | | 63 | 5 | 60 | <20 | B |
| R | 2 | 1 DDPC r | | | b 0.5 | 0.47 | | 100 | 17 | 40 | <20 | A |
| S | 2 | 2 DDPC r | | | b 0.5 | 0.50 | | 86 | 76 | 40 | <20 | B |
| T | 4 | 2 DDPC r | | d 1 | a 1.0 | 0.45 | | 85 | 66 | 60 | <20 | A |
| U | 4 | 1 DDPC r | 2.5 | | | 0.42 | | 75 | 40 | 60 | 40 | B |
| V | 4 | 2 DDPC r | | | | 0.42 | | 75 | 20 | 60 | <10 | B |
| W | 4 | 2 DDPC r | 2.5 | | a 1.0 | 0.40 | | 105 | 90 | 60 | 40 | B |
| X | 4 | 2 DDPC r | 2.5 | | b 1.0 | 0.56 | | 100 | 95 | 60 | 40 | A |
| Y | 4 | 2 DDPC r | 5.0 | | a 1.0 | 0.50 | | 100 | 70 | 60 | 40 | A |
| Z | 4 | 2 BMDPC h | 2.5 | c 1 | b 1.0 | 0.52 | | 40 | 10 | 60 | 30 | B |
| AA | 4 | 2 BMPPC i | 2.5 | d 1 | e 1.0 | 0.56 | | 55 | 20 | 60 | <40 | B |
| BB | 4 | 2 TMPPC j | 2.5 | d 1 | e 1.0 | 0.48 | | 85 | 41 | 60 | 40 | B |
| CC | 4 | 2 BMNDPC k | 2.5 | | e 1.0 | 0.45 | | 95 | 78 | 60 | 40 | B |
| DD | 4 | 2 DBPC l | | | e 1.0 | 0.52 | 20 | TWTT | | <20 | 10 | B |
| EE | 4 | 2 BBPC m | | d 1 | e 1.0 | 0.61 | 25 | TWTT | | <20 | 10 | B |
| FF | 4 | 2 DMPC n | | | e 1.0 | 0.47 | 10 | TWTT | | <20 | 10 | B |
| GG | 4 | 2 BHT o | | | e 1.0 | 0.46 | 28 | TWTT | | <20 | 10 | B |
| HH | 4 | 2 BPPC p | | | e 1.0 | 0.48 | 35 | TWTT | | 20 | <20 | B |

1 1 hour.
a Dilauryl thiodipropionate.
b Poly(thiodipropionate ester) of 1,4-cyclohexanedimethanol (Mol. Wt. 700–800).
c Poly(pentaerythritol phosphite).
d Distearyl pentaerythritol diphosphite (Weston WX 618).
e Poly(thiodipropionate ester) of 1,4-cyclohexanedimethanol (Mol. Wt. 2,500–2,800).
f "Rosin Amine D" (dihydroabietyl amine).
g Polyethyleneimine.
h 2,6-bis(methyldecyl)-p-cresol.
i 2,6-bis(methylpentadecyl)-p-cresol.
j 2,4,6-tris(methylpentadecyl)-p-cresol.
k 2,6-bis(methylnonadecyl)-p-cresol.
l 2,6-dibenzyl-4-methylphenol.
m 2-benzyl-6-tert-butyl-4-methylphenol.
n 2,4-dimethyl-6-(1-methyl-1-cyclohexyl)phenol.
o 2,6-di-tert-butyl-4-methylphenol.
p 2,6-di-tert-butyl-4-(4-tert-butylphenyl)phenol.
q 2,6-bis(methylheptadecyl)-p-cresol.
r 2,6-didodecyl-p-cresol.
s Rutile "TiPure" 610.
t Poly(dimethylaminoethylmethacrylate).

Example 3.—Stabilization of Polymer B (see Example 2) employing zinc oxide pigment In addition to the employment of TiO$_2$ as illustrated in Examples 1 and 2, another illustrative pigment which may be employed is zinc oxide as illustrated by the following data as to undyed samples:

| Sample | Additives (Percent) | | | Fade-Ometer Hours |
|---|---|---|---|---|
| | ZnO | DDPC | DLTDP | |
| A | 4 | 2 | 0.5 | 40 |
| B | 10 | 2 | 0.5 | 60 |

The improvement achieved by Example 3, Samples A and B can be shown with respect to comparative Sample P of Example 2 which had a life of only 20 hours in the Fade-Ometer. Among the unexpected discoveries embodied in this invention, it has been found that 2,6-di-n-dodecyl-p-cresol (DDPC) provides unexpectedly good stability even when employed as the sole stabilizer. This is particularly applicable to its employment as a thermal stabilizer. When light stability is especially desired, it is advantageous to employ DDPC in a synergistic combination with a thio-ester, an inorganic pigment such as TiO$_2$ or ZnO and a polymeric aliphatic amine.

The 2,6-di-n-alkyl-p-cresols can be prepared by the following process:

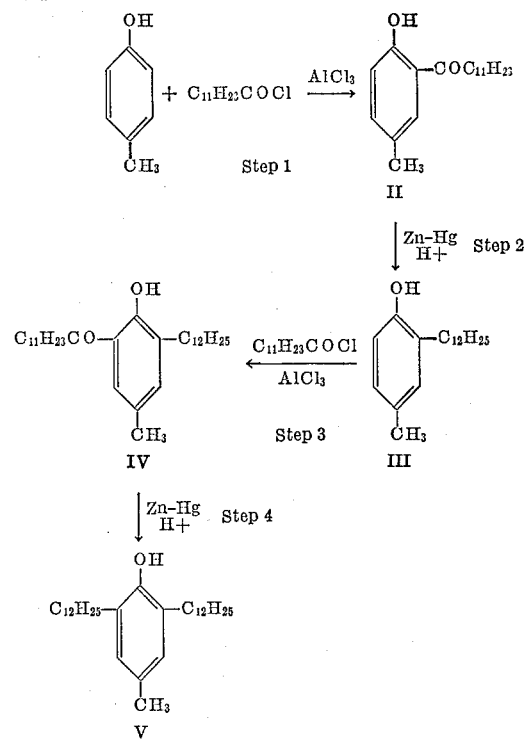

p-Cresol (I) is reacted with n-dodecanoyl chloride to prepare 2-dodecanoyl-p-cresol (II) which was then reduced with zinc amalgam to give 2-n-dodecyl-p-cresol (III). The reaction of this product with another mole of n-dodecanoyl chloride followed by a second reduction with zinc amalgam gave 2,6-di-n-dodecyl-p-cresol (V). DDPC was purified by distillation and/or by recrystallization from acetic acid. It is a white solid melting at 56–59° C.

Examples 4–9.—See Examples 1, 2, 3, 5, 6 and 8 of Case G

These examples further supplement those set forth in Examples 1A–1K, Examples 2A–2HH and Example 3.

Although stabilizers as set forth in the instant Case H serve a valuable purpose, it should not be overlooked that the segmented copolymers of this case are inherently stable in several respects including their natural resistance to yellowing in normal use in fabrics suited for wearing apparel. Tests can be performed to evaluate these advantageous characteristics using films of the copolymers described in Cases A, B and C and comparing them with prior art films.

Films cast from segmented urethane copolymers prepared from aliphatic diisocyanates and functionally nonaromatic diamines show unusual stability to atmospheric gas fading or yellowing as compared to films of corresponding polymers prepared from aromatic diisocyanates and aromatic diamines. A film according to the present invention without any additives (see Example 1 of Case B) was tested in a gas Fade-Ometer, described in the 1962 technical manual of the A.A.T.C.C., Volume XXXIX, and showed no yellowing in 85 hours. A film cast from a polymer made from a copolyether glycol, 4,4'-diphenylmethane diisocyanate and 4,4'-diphenylmethanediamine yellowed in 6 hours. A film cast from a polymer made from poly(tetramethylene oxide)glycol, 4,4'-diphenylmethane diisocyanate, and chain extended with water yellowed in less than 18 hours. A film cast from a polymer prepared from a copolyether glycol, hexamethylenediisocyanate, and 4,4'-diphenylmethanediamine yellowed in 6 hours. Therefore, it appears that when the polymer has a

attached directly to an aromatic ring, the formation of a yellow color in the polymer is a serious problem. The yellowing can be eliminated by using diamines and diisocyanates in which the amino and isocyanato groups are attached to aliphatic carbon atoms. However, other aspects affecting stability are not necessarily eliminated.

The prior art and other references cited above illustrate the fact that the problems involved in stabilizing spandex fibers are quite substantial and no predictions can be made from what has been found useful in regard to other types of fibers. Thus, U.S. Patent No. 2,999,839 issued Sept. 12, 1961 to Arvidson indicates that elastomers derived from functionally aromatic diisocyanates or diamines can be stabilized with aliphatic amines having a molecular weight above about 280 including, for example, poly(N,N-diethyl-beta-aminoethyl methacrylate), polyethylene imine, dihydroabietyl amine, etc. However, this patent recognizes that the discovery of a stabilizing effect is quite limited and it cannot be assumed that it would be operative with regard to other elastomers such as those covered by the instant Case H where the elastomers are derived from functionally aliphatic diisocyanates and diamines.

Another aspect of this matter is the fact that stability in some respects is enhanced by the presence of inorganic pigments or delustering agents, e.g., TiO₂.

Stabilizers are referred to in U.S. 2,929,804 and U.S. 3,097,192 (as well as U.S. 2,999,841 mentioned above) as being useful in segmented polyurethane copolymeric spandex fibers derived from functionally aromatic constituents, e.g., catechol, 2,2'-methylene bis(6-tert-butyl-4-methylphenol), and butylated hydroxyanisole none of which stabilizers are of significant value with regard to the instant invention. Problems associated with the stabilization of spandex fibers are discussed in U.S. 2,999,839, and U.S. 3,095,322. Problems of related nature are discussed with regard to elastomeric compositions in U.S. 2,843,568, U.S. 2,917,486 and U.S. 2,999,842. Such prior art merely emphasizes the unpredictability of experimental work in the field of stabilizing spandex fibers.

The phosphite esters defined above include those illustrated in U.S. 3,053,878 which describes pentaerythritol phosphite esters and U.S. 3,047,608 which describes trialkyl phosphites and polyphosphite esters. Illustrative compounds which can be employed include those having the general formula:

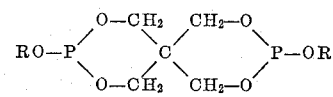

wherein R is an alkyl radical having from 1 to 20 carbon atoms, e.g., stearyl. Other illustrative compounds have the following general formula:

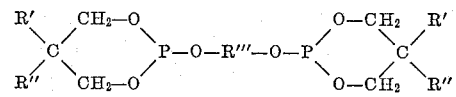

wherein each of R' and R" represent alkyl radicals having from 1 to 20 and R'' ' is an alkylene radical, cycloalkylene radical or alkylene-arylene-alkylene radical having from 2 to 20 carbon atoms, e.g., ethylene, 1,10-decamethylene, 1,4-cyclohexanedimethylene, 1,4-xylylene, 1,18-octadecamethylene, etc. The simple trialkyl phosphite which can be employed are illustrated by the following formula:

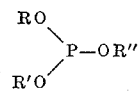

wherein R, R' and R" are as defined above, e.g., tridodecyl phosphite, tripentadecyl phosphite, triotadecyl phosphite, dioctadecyl-methyl phosphite, etc.

Various inorganic pigments have been illustrated above. Such pigments include zinc oxide, zinc sulfide, anatast (TiO₂), rutile (TiO₂), diatomaceous earth, silica, calcium carbonate, calcium sulfate, calcium silicate, alumnia, clays, magnesium carbonate, magnesium oxide, iron oxide, antimony oxide, lead chromate, cadmium sulfide, cadmium selenide, mercuric sulfide, lead silicate, dibasic lead phosphite, lead silicate, barium sulfate, carbon black, etc. Especially unobvious improvements have been achieved as shown in the examples employing TiO₂ since this pigment unexpectedly contributes improved stability in a synergistic manner.

The invention has been described in considerable detail with particular reference to preferred embodiments thereof, but it will be understood that variations and modifications can be effected within the spirit and scope of the invention as described hereinabove and as defined in the appended claims.

The embodiments of the invention in which an exclusive property or privilege is claimed are defined as follows:

1. A non-yellowing stabilized elastomeric polyurethane-urea linear copolymer being a segmented urea/urethane/HOPOH copolymer wherein P represents the polymeric residue of a low melting hydroxyl-terminated polymer selected from the group consisting of polyethers, polyesters, poly(ester-ethers) and urethane-linked oligomers thereof, said segmented copolymer having a polymer melt temperature above 150° C. and an inherent viscosity of at least 3.0 when dissolved in 60% phenol and 40% tetrachloroethane, said copolymer containing urea segments, each segment being composed of at least one unit selected from the following two formulas including mixtures thereof:

—A—NH—CO—NH—D—NH—CO—NH— and

—A—NH—CO—NH— wherein A is the residue of a dissocyanate of the formula OCN—A—NCO wherein each isocyanate group is bonded to a carbon atom which is bonded to three other atoms and D is a chemical bond or the residue of a diamine of the formula $H_2N$—D—$NH_2$ wherein each $NH_2$ group is bonded to a carbon atom which is bonded to three other atoms, having incorporated in the elastomeric poly-urethane-urea linear copolymer as an additive (based on the weight of the linear copolymer):

(1) from 0.1% to 10% of a 2,4,6-trialkylphenol wherein the total number of carbon atoms in the three alkyl radicals is from 20 to 60, or (2) an additive comprising from 0.1% to 10% of said trialkyl phenol and one or more of the following additional compounds:

(a) from 0.1 to 5% of a thioester which is a mono or dihydric alcohol ester of thiodipropionic acid or thiodibutyric acid in which the monohydric alcohol radicals are present in simple esters as alkyl radicals having from 12 to 20 carbon atoms and the dihydric alcohol radicals are present in polyesters as alkylene radicals having from 2 to 20 carbon atoms, said polyester having at least two repeating units and a molecular weight of from about 400 to about 4,000, (b) from 0.1 to 2% of an organic phosphite having at least 2 organic radicals, each of which has from 1 to 40 carbon atoms, preferably organic radicals composed of carbon atoms and hydrogen atoms which may include intra-linear —O— or —S— atoms between carbon atoms, said phosphites being monomeric or polymeric in molecular structure, (c) from 1 to 15% of an aliphatic amine having a molecular weight above about 280, (d) from 1 to 30% of an inorganic pigment, the total of said additives other than (d) being not more than 15% and the total of all of said additives including (d), if present, being not more than 45% based on the weight of the linear copolymer.

2. The stabilized copolymers of claim 1 wherein said trialkylphenol is 2,6-didodecyl-p-cresol.

3. The stabilized copolymers of claim 1 wherein said trialkylphenol is bis(methylheptadecyl)-p-cresol.

4. The stabilized copolymers of claim 1 which contain a synergistic combination of said trialkylphenol and said thioester.

5. The stabilized copolymers of claim 4 wherein said trialkylphenol is 2,6-didodecyl-p-cresol and said thioester is dilauryl thiodipropionate.

6. The stabilized copolymers of claim 4 wherein said trialkylphenol is 2,6-didodecyl-p-cresol and said thioester is a polyester of thiodipropionic acid and 1,4-cyclohexanedimethanol terminated with stearyl alcohol.

7. The stabilized copolymers of claim 4 wherein said trialkylphenol is 2,6-bis(methylheptadecyl)-p-cresol and said thioester is a polyester of thiodipropionic acid and 1,4 - cyclohexanedimethanol terminated with stearyl alcohol.

8. The stabilized copolymers of claim 5 which contain poly(pentaerythritol phosphite).

9. The stabilized copolymers of claim 6 which contain poly(pentaerythritol phosphite).

10. The stabilized copolymers of claim 7 which contain poly(pentaerythritol phosphite).

11. The stabilized copolymers of claim 1 which contain a polymer having a molecular weight above about 280 of N,N-diethyl-beta-aminoethyl methacrylate as said aliphatic amine.

12. The stabilized copolymers of claim 1 which contain $TiO_2$ as said inorganic delustering agent.

13. Elastomeric fibers of the stabilized copolymers of claim 1.

14. Elastomeric fibers of the stabilized copolymers of claim 2.

15. Elastomeric fibers of the stabilized copolymers of claim 3.

16. Elastomeric fibers of the stabilized copolymers of claim 4.

17. Elastomeric fibers of the stabilized copolymers of claim 11.

18. Elastomeric fibers of the stabilized copolymers of claim 12.

19. The stabilized copolymers of claim 1 wherein said diisocyanate is selected from the group consisting of meta- and para-xylylene diisocyanate, said diamine is selected from the group consisting of m-xylylenediamine, p-xylylenediamine, and alkanediamines having from 2 to 10 carbon atoms, and said low-melting hydroxyl-terminated polymer comprises a polymer of tetramethylene glycol.

References Cited

UNITED STATES PATENTS

| | | | |
|---|---|---|---|
| 3,157,517 | 11/1964 | Tholstrup et al. | 260—45.85 |
| 2,830,038 | 4/1958 | Pattison | 260—45.95 |
| 2,915,496 | 12/1959 | Swart et al. | 260—45.7 |
| 2,929,804 | 3/1960 | Stuber | 260—32.6 |
| 2,999,839 | 9/1961 | Arvidson et al. | 260—77.5 |
| 3,039,993 | 6/1962 | Friedman | 260—45.95 |
| 3,072,605 | 1/1963 | Rogers et al. | 260—45.95 |
| 3,169,934 | 2/1965 | Dennett et al. | 260—45.95 |
| 3,225,007 | 12/1965 | Gruber et al. | 260—37 |

FOREIGN PATENTS

| | | |
|---|---|---|
| 1,366,533 | 6/1964 | France. |
| 929,435 | 6/1963 | Great Britain. |

OTHER REFERENCES

Oil and Colour Chemists Association Journal, vol. 43, No. 2, February 1960, pages 96, 110, and 111, TP 934.027.

MORRIS LIEBMAN, *Primary Examiner.*

B. A. AMERNICK, *Assistant Examiner.*